H. E. HALLER.
OIL FILTER.
APPLICATION FILED MAY 13, 1910.
1,010,622.
Patented Dec. 5, 1911.
2 SHEETS—SHEET 1.
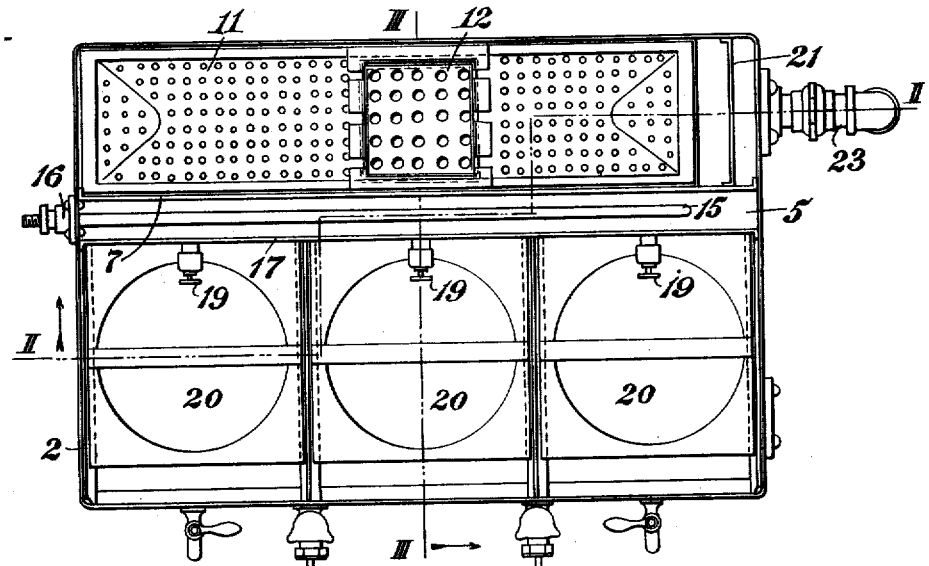
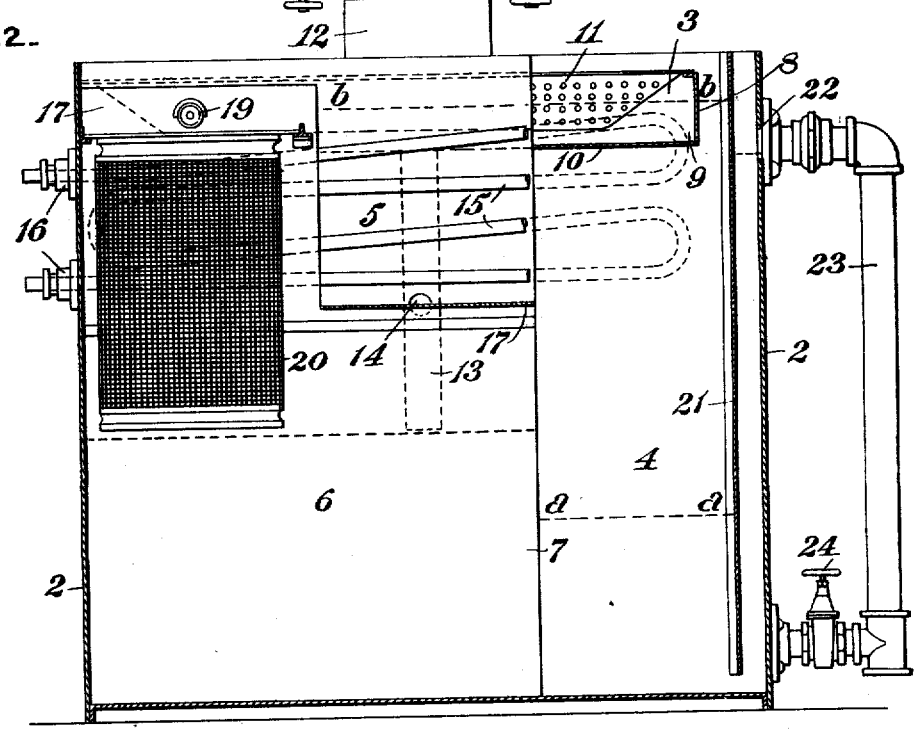
WITNESSES
INVENTOR
Henry E. Haller
by W. G. Doolittle
Attorney

H. E. HALLER.
OIL FILTER.
APPLICATION FILED MAY 13, 1910.

1,010,622.

Patented Dec. 5, 1911.
3 SHEETS—SHEET 2.

WITNESSES
J. E. Gaither.
Ella McConnell

INVENTOR
Henry E. Haller
by W. G. Doolittle
Attorney

UNITED STATES PATENT OFFICE.

HENRY E. HALLER, OF PITTSBURGH, PENNSYLVANIA, ASSIGNOR TO NATIONAL VALVE AND MANUFACTURING COMPANY, OF PITTSBURGH, PENNSYLVANIA, A CORPORATION OF PENNSYLVANIA.

OIL-FILTER.

1,010,622. Specification of Letters Patent. Patented Dec. 5, 1911.

Application filed May 13, 1910. Serial No. 561,136.

*To all whom it may concern:*

Be it known that I, HENRY E. HALLER, a resident of Pittsburgh, in the county of Allegheny and State of Pennsylvania, have invented certain new and useful Improvements in Oil-Filters, of which the following is a specification.

An object of my invention is to provide a new and improved apparatus for cleaning or filtering waste-oil without bringing the oil being treated into contact with a body of water.

A further object of the present invention is to provide means whereby the oil may be thoroughly heated and while in a heated and thin state be immediately introduced into a filtering cylinder for its final cleaning.

Figure 3:
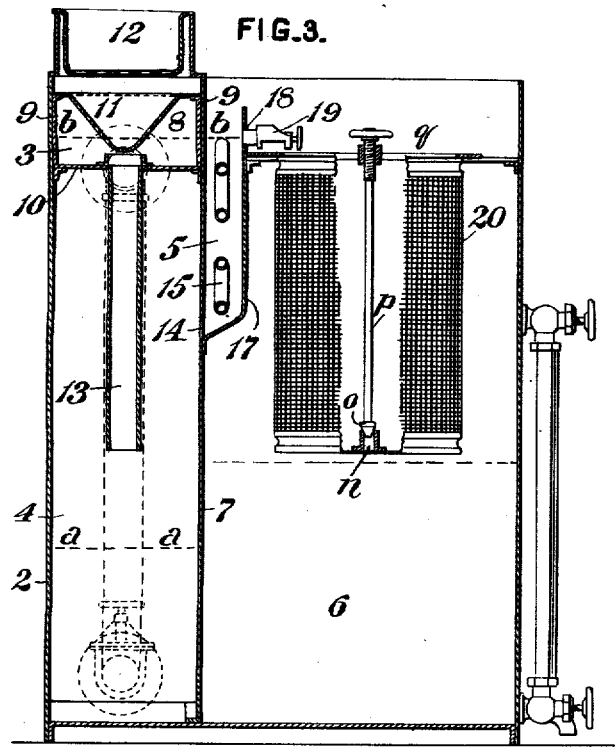
Figure 4:
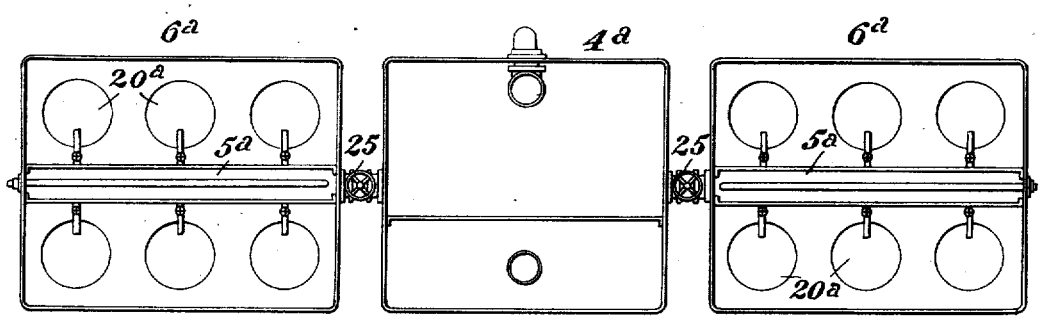

In the accompanying drawings, which illustrate applications of my invention, Figure 1, is a plan of an oil filter embodying my invention; Fig. 2 a part sectional and a part elevational view of the form of Fig. 1, taken on line II—II of Fig. 1; Fig. 3, a similar view taken on line III—III of Fig. 1; Fig. 4, a diagrammatic plan of a modified form of filter; and Fig. 5, a vertical sectional view of a modified form of filtering basket.

While I have shown my invention embodied in filters having a plurality of filtering-cylinders and particularly designed for use in continuous oiling systems my invention is equally applicable to smaller types of filters having only a single cylinder and designed for use when the dirty oil is carried by an attendant and poured by hand into the filter.

Referring to the drawings and first to the form of Fig. 1, 2 designates the filter casing or body, as illustrated the casing or body is of rectangular form but the form shown is not essential. The interior of the casing is divided by suitable walls or partitions into a receiving-chamber or compartment 3, a settling-chamber 4, a heating-chamber 5, and a pure-oil chamber or compartment 6. An interior wall 7 of substantially the same height as the walls of the casing and extending entirely across the body of the filter enters into the formation of all of the chambers or compartments above mentioned.

The waste-oil receiving compartment proper is formed by vertically extending plate-members 8 and 9, and a cross-plate-member 10, forming a removable structure which is supported by and between the wall 7 and a wall of the casing. Located in the waste-oil receiving-compartment is a trough-like strainer 11 and arranged centrally of and above strainer 11 I preferably provide a strainer 12.

The waste-oil receiving-chamber is in communication with the settling-chamber 4, by means of a pipe 13 through which oil from chamber 3 is introduced into chamber 4. In the type of filter shown by Fig. 1, a body of water extending upwardly from the bottom of chamber 4 to a predetermined level, as for example, to a level indicated by the line *a—a*, is maintained in said chamber. In the operation of the filter the oil level is maintained at, for example, the line *b—b*, and it will be noted that the in-coming oil introduced into chamber 4 through the pipe 13 does not come into contact with the water in said chamber as is usual in filters of this class, but is introduced into the body of oil and not into the water.

The settling-chamber is in communication with the heating-chamber by means of a port or a series of ports 14 formed in the wall 7. Located in the heating-chamber 5, I provide heating coils 15 having their ends passed through a wall of the casing and designed to communicate with a source of steam heat supply. The ends of the heating coils are passed through two glands 16, provided with packing nuts and are adapted to be inserted and removed from the filter with but very little trouble, and without disturbing the other parts. As illustrated, the heating-chamber in addition to the wall 7 is formed by an inclined and upwardly projecting plate 17 having its upper edge lying in a lower horizontal plane than the upper end of wall 7 and having a short distance below its upper edge, a series of openings 18 into each of which is placed a valve-connection 19 adapted to convey the heated oil to a filtering-cylinder 20 located in close proximity to the heating-chamber. The heating chamber 5 is a comparatively narrow one and the oil passes up through said chamber in direct contact with the heating coils, thereby causing the oil to become thoroughly heated and thinned, and any entrained water and other impurities to drop into the bottom of said chamber and pass from the heating-chamber back into the settling-chamber and into the water in the bottom thereof from which the water is automatically discharged and from which the solid accumulated matter may be removed from time to time as it becomes necessary.

The settling chamber of the filter is provided near one end with a partition 21 extending from the top thereof to a line slightly above its bottom but below the water level *a—a*, to form an automatic water overflow which will permit a quantity of water, proportionate to the amount of water contained in the waste oil introduced into the settling chamber, to pass therefrom through a port 22 into a pipe 23 leading to a sewer or other outlet source. Owing to the difference in the specific gravity between the oil and water the former will be maintained at a higher level in the main portion of the settling chamber than the latter in the water overflow, and port 22 is so located that the oil will rise sufficiently high to pass through heating chamber 5 and openings 18 to the pure oil chamber when the water in the overflow is on a level with the port as shown in Fig. 2. Pipe 23 has a valve-controlled connection 24 with the lower portion of the filter, which construction provides means for flushing or cleaning the filter when desired.

By locating the upper edge of member 17 some distance below the upper edge of wall 7, or in other words, by terminating the wall of the pure-oil chamber below the wall of the automatic water overflow, I provide means for taking care of a sudden rise of oil of such a character that could not be passed to the filtering cylinder through the valve connections 19. This feature makes it possible to save the oil which might otherwise back out and flow into the automatic water overflow and be lost.

Figure 5:
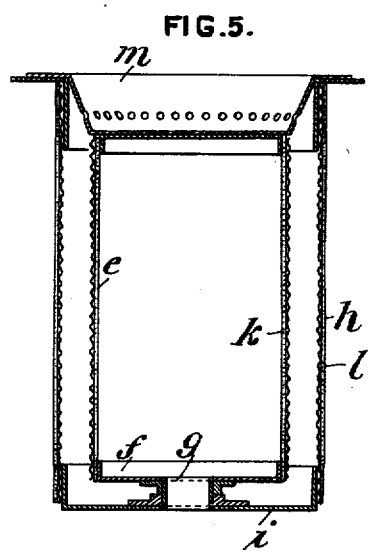

The filtering-cylinders 20 are located in the pure-oil chamber 6, and, as stated above, in proximity with the heating chamber, thereby enabling the heated oil to be passed to the respective cylinders before it becomes cooled and while it is in a thin condition, or the best possible condition for being acted on by the filtering-cylinders. The cylinders may be of the form shown by Fig. 3, or the form shown by Fig. 5. The form of Fig. 3 is a single walled filter, while the form of Fig. 5 is a double walled filter. The latter form of filtering cylinder is the preferred form particularly for use in large capacity filters and it comprises an inner wall or section *e*, a bottom member *f* having an opening *g*; an outer section or wall *h* having a bottom *i* with the walls each respectively provided with a suitable filtering cloth *k* and *l*. In this form oil from a strainer *m* is introduced to the filter between the two walls and passes through the respective walls into the pure oil compartment. In the form of Fig. 3, I provide an opening *n* in the bottom plate and a valve *o* having a valve-stem *p* extending upwardly and through a threaded member *q*.

Fig. 4 illustrates diagrammatically a modified form of filter embodying my invention. In this form I provide two pure-oil chambers or compartments 6ª each in communication with a common settling-chamber 4ª by means of valve controlled pipes or passages 25, two heating-chambers 5ª and a series of filtering cylinders 20ª located on both sides of the respective heating-chambers. The mode of operation of this form of filter is substantially the same as in the form above described.

What I claim is:

1. In an apparatus for filtering oil, a settling-chamber having a water area and an oil area therein, a pure-oil chamber, a filtering means in the pure-oil chamber, an automatic water overflow, and a heating chamber having the upper edge of a wall thereof terminating in a lower horizontal plane than the upper edge of an adjacent wall of the automatic water overflow.

2. In an apparatus for filtering oil, a settling-chamber having a water area and an oil area therein, a pure-oil chamber, a filtering-means in the pure-oil chamber, an independent heating-chamber through which the oil to be treated travels, said heating-chamber located above the water area of the settling-chamber.

3. In an apparatus for filtering oil, a settling-chamber having a water area and an oil area therein, a pure-oil chamber, a filtering-means in the pure-oil chamber, an independent heating-chamber through which the oil to be treated travels, said heating-chamber located above the water area of the settling-chamber, and valve-controlled means connecting the heating and pure-oil chambers.

4. In an apparatus for filtering oil, a settling-chamber having a water area and an oil area therein, an oil inlet pipe in the settling-chamber having its lower end terminated above the water area, a pure-oil chamber, a filtering means in the pure-oil chamber, an independent heating-chamber through which the oil to be treated travels, said heating-chamber located above the water area of the settling-chamber, and a valve-controlled means connecting the heating and pure-oil chambers.

5. In an apparatus for filtering oil, a settling-chamber, an automatic water overflow, a pure-oil chamber having a wall thereof terminating in a lower horizontal plane than the adjacent wall of the automatic water overflow, a filtering means in the pure-oil chamber, and means connecting the settling and pure-oil chambers.

6. In an apparatus for filtering oil, a settling-chamber, an automatic water overflow in the settling-chamber, a pure-oil chamber having a wall thereof terminating in a lower horizontal plane than the adjacent wall of the automatic water overflow, a filtering means in the pure-oil chamber, and means located below the upper edge of the said wall of the pure-oil chamber for permitting a passage of oil from the settling chamber to the pure-oil chamber.

7. In an apparatus for filtering oil, a settling chamber, a pure-oil chamber, a filtering means in the pure-oil chamber, an independent heating chamber through which the oil to be treated travels, and an automatic water overflow, said heating chamber having the upper edge of a wall thereof terminated in a lower horizontal plane than the upper edge of an adjacent wall of the automatic water overflow.

8. In an apparatus for filtering oil, a settling-chamber having a water area and an oil area therein, a pure-oil chamber, a filtering means in the pure-oil chamber, an independent heating chamber through which the oil to be treated travels, said heating chamber located above the water area of the settling chamber, an automatic water overflow, and valve controlled means connecting the heating and pure-oil chambers.

In testimony whereof I affix my signature in presence of two witnesses.

HENRY E. HALLER.

Witnesses:
W. G. DOOLITTLE,
F. E. GAITHER.